United States Patent
Eisenberg et al.

(10) Patent No.: US 10,191,975 B1
(45) Date of Patent: Jan. 29, 2019

(54) FEATURES FOR AUTOMATIC CLASSIFICATION OF NARRATIVE POINT OF VIEW AND DIEGESIS

(71) Applicants: Joshua Daniel Eisenberg, Miami, FL (US); Mark Finlayson, North Bay Village, FL (US)

(72) Inventors: Joshua Daniel Eisenberg, Miami, FL (US); Mark Finlayson, North Bay Village, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/804,589

(22) Filed: Nov. 16, 2017

(51) Int. Cl.
G06F 17/27 (2006.01)
G06F 17/30 (2006.01)
G06F 17/24 (2006.01)
G06F 17/21 (2006.01)

(52) U.S. Cl.
CPC ...... *G06F 17/30707* (2013.01); *G06F 17/218* (2013.01); *G06F 17/24* (2013.01); *G06F 17/274* (2013.01); *G06F 17/2705* (2013.01); *G06F 17/277* (2013.01); *G06F 17/2785* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795

USPC .................................................. 704/1, 9, 10
See application file for complete search history.

(56) References Cited

U.S. PATENT DOCUMENTS

| | | | | |
|---|---|---|---|---|
| 6,199,034 B1 * | 3/2001 | Wical | ................. | G06F 17/2785 704/9 |
| 7,779,049 B1 * | 8/2010 | Phillips | ............... | G06F 17/3064 707/809 |
| 8,972,265 B1 * | 3/2015 | Lester | ..................... | G10L 13/00 704/246 |
| 9,773,166 B1 * | 9/2017 | Connor | ................. | G06F 17/271 |
| 2005/0108630 A1 * | 5/2005 | Wasson | ................. | G06F 17/241 715/230 |
| 2009/0100454 A1 * | 4/2009 | Weber | ................. | G11B 27/034 725/9 |
| 2009/0124272 A1 * | 5/2009 | White | .................. | G10L 15/193 455/466 |
| 2010/0218094 A1 * | 8/2010 | Ofek | ...................... | A63F 13/12 715/706 |

(Continued)

OTHER PUBLICATIONS

Kudo et al., Chunking with Support Vector Machines, 2001, NAACL, ACL, pp. 1-8.*

(Continued)

*Primary Examiner* — Lamont M Spooner
(74) *Attorney, Agent, or Firm* — Saliwanchik, Lloyd & Eisenschenk (57) ABSTRACT

Methods for classifying a point of view and diegesis are provided. A method can include providing a processor in operable communication with a computer-readable medium, receiving a narrative text, extracting a set of features from the narrative text, transmitting the features into a feature vector, transmitting a plurality of feature vectors to a support vector machine, predicting a point of view and diegesis for the narrative text associate with a particular feature vector, and annotating the narrative text.

13 Claims, 3 Drawing Sheets

(56) References Cited

U.S. PATENT DOCUMENTS

| | | | | |
|---|---|---|---|---|
| 2012/0036130 | A1* | 2/2012 | Light | G06F 17/278 707/736 |
| 2013/0138435 | A1* | 5/2013 | Weber | G06F 17/21 704/231 |
| 2013/0179169 | A1* | 7/2013 | Sung | G06F 17/27 704/254 |
| 2014/0095418 | A1* | 4/2014 | Scholand | G06F 17/279 706/46 |
| 2014/0195884 | A1* | 7/2014 | Castelli | G06F 17/278 715/201 |
| 2014/0236578 | A1* | 8/2014 | Malon | G06F 17/28 704/9 |
| 2015/0120756 | A1* | 4/2015 | Grunick | G06F 17/30876 707/748 |
| 2015/0332665 | A1* | 11/2015 | Mishra | G10L 15/1815 704/257 |
| 2016/0111016 | A1* | 4/2016 | Govindaraj | G09B 19/00 434/156 |
| 2017/0024375 | A1* | 1/2017 | Hakkani-Tur | G06F 17/2785 |
| 2017/0161372 | A1* | 6/2017 | Fern ndez | G06F 17/218 |
| 2017/0323011 | A1* | 11/2017 | Byron | G06F 17/30675 |

OTHER PUBLICATIONS

Eisenberg et al., Automatic Identification of Narrative Diegesis and Point of View, Nov. 5, 2016, ACL, pp. 36-46.*

Aufderheide, "Public intimacy: the development of first-person documentary," Afterimage: The Journal of Media Arts and Cultural Criticism, Jul. 1997, pp. 1-13.

Ceran et al., "A hybrid model and memory based story classifier," The Third Workshop on Computational Models of Narrative, May 2012, pp. 58-62.

Chang et al., "LIBSVM: a library for support vector machines," ACM Transactions on Intelligent Systems and Technology, Apr. 2011, pp. 1-39.

Davison, "The third-person effect in communication," The Public Opinion Quarterly, Jan. 1983, pp. 1-15, vol. 47, No. 1.

Finlayson, "Collecting semantics in the wild: the story workbench," Proceedings of the AAAI Fall Symposium on Naturally Inspired Artificial Intelligence, Nov. 2008, pp. 1-8.

Finlayson, "The story workbench: an extensible semi-automatic text annotation tool," Proceedings of the Fourth Workshop on Intelligent Narrative Technologies, Oct. 2011, pp. 21-24.

Gordon et al., "Identifying personal stories in millions of weblog entries," Proceedings of the Third International Conference on Weblogs and Social Media, May 2009, pp. 1-8.

Landis et al., "The measurement of observer agreement for categorical data," Biometrics, Mar. 1977, pp. 159-174, vol. 33, No. 1.

Manning et al., "The stanford coreNLP natural language processing toolkit," Proceedings of the 52nd Annual Meeting of the Association for Computational Linguistics, Jun. 2014, pp. 1-6.

Sagae et al., "A data-driven approach for classification of subjectivity in personal narratives," Proceedings of the 2013 International Workshop on Computational Models of Narrative, Aug. 2013, pp. 198-213.

Verhagen et al., "SemEval-2007 Task 15: TempEval temporal relation identification," Proceedings of the 4th International Workshop on Semantic Evaluations, Jun. 2007, pp. 75-80.

Wiebe, "Tracking point of view in narrative," Computational Linguistics, Jun. 1994, pp. 233-287, vol. 20, No. 2.

* cited by examiner

FEATURES FOR AUTOMATIC CLASSIFICATION OF NARRATIVE POINT OF VIEW AND DIEGESIS

STATEMENT OF GOVERNMENT SUPPORT

This invention was made with government support under Grant No. 5R01GM105033-02 awarded by National Institutes of Health. The government has certain rights in the invention.

BACKGROUND

The style of narrative news affects how it is interpreted and received by readers. Two key stylistic characteristics of narrative text are point of view and diegesis: respectively, whether the narrative recounts events personally or impersonally, and whether the narrator is involved in the events of the story. Although central to the interpretation and reception of news, and of narratives more generally, there has been no prior work on automatically identifying these two characteristics in text.

BRIEF SUMMARY

Embodiments of the subject invention include a set of features to permit raw text to be classified in terms of the point of view and diegesis of the text. Embodiments can be used for automated narrative structure parsing of text data. The methods described herein can use machine learning techniques to predict the point of view and diegesis of text.

Embodiments of the subject invention can use software that automatically analyzes text, or natural language processing pipelines, and assist computer systems to interpret natural language to make decisions. The features for classification of n the point of view and diegesis can be used to provide computers with knowledge about narrators and their relationship to the story being told.

DETAILED DESCRIPTION

Embodiments of the subject invention include a set of features, and methods of utilizing the same, that allows raw text to be automatically classified in terms of point of view and diegesis (e.g., either homodiegetic or heterodiegetic) and used for narrative structure parsing. It can also be used to give artificial intelligent agents awareness of the point of view and diegesis of a short span text, which is useful for interpreting stories and understanding narrators. Intelligent agents can use the diegesis to determine if a story is told personally or removed (impersonally).

Embodiments of the subject invention can use software that automatically analyzes text, or natural language processing pipelines, and assist computer systems to interpret natural language to make decisions. The features for classification of point of view and diegesis can be used to provide computers with knowledge about narrators and their relationship to the story being told. The systems and methods described herein can be used for higher level reasoning about narrative structure.

Figure 1:
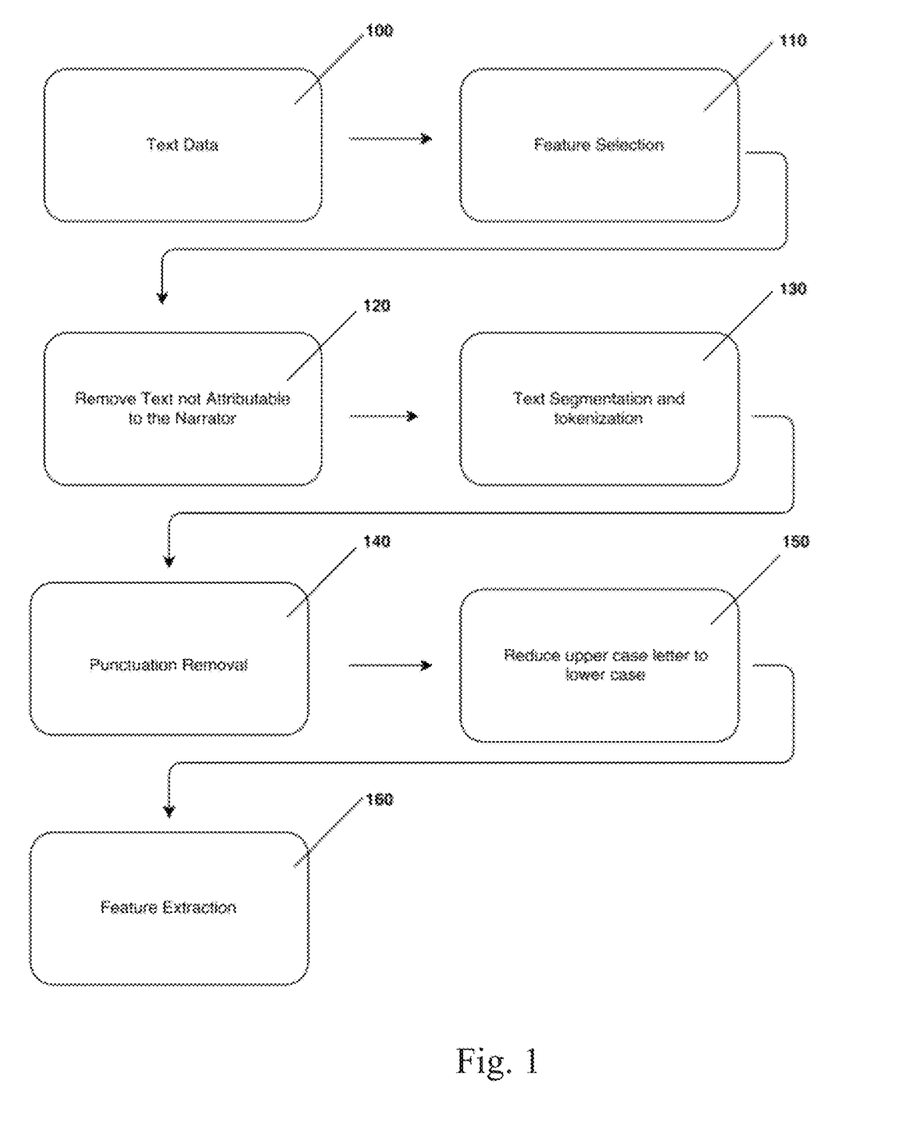
FIG. 1 is a diagram of a feature extraction pipeline according to an embodiment of the subject invention.

Embodiments of the subject invention provide a pipeline for feature extraction, as seen in FIG. 1. An initial step in a pipeline or method to extract features from text data 100 can be to remove text that is not directly the speech of the narrator. A user can choose which features to extract from the text data 110. One method to remove speech that is not attributable to the narrator is to remove quoted text from the raw text 120. A next step can break up the text into sentences 130. Punctuation characters can be removed from the text 140 (for example, ".", "?", "!", ",", ";", and ":"). A next step can be to convert every character that remains to lower case 150. A next step can be the program counts how many times each of the 21 pronouns from Table 1 are used. A next step can be to place an integer value for the number of times each pronoun is used into a feature vector. The value of a 22nd feature can be, for example, calculated as the number of times a 1st person pronoun is used in the argument of a verb. Each sentence can be organized as a rooted tree, including a parse tree. Each sentence can be processed, for example using semantic role labeling techniques, to detect semantic arguments of the sentences. Processing the sentence can include determining if there are any first person pronouns in the arguments. The number of sentences with first person pronouns in these arguments can be summed, and the value of a $22^{nd}$ feature can be set to this sum. The feature vector can be classified through machine learning techniques, including a support vector machine model.

The extracted features can be the number of times pronouns, as seen in Table 1, are used within a specific body of test. These features can be used to classify the text in terms of the narrative point of view and diegesis. Embodiments of the subject invention include a set of 22 features that allows a computer to classify the narrative diegesis of texts. For diegesis classification, a feature can be the number of times a $1^{st}$ person pronoun (for example, the pronouns listed in the first row of Table 1) appears in the argument of a verb.

TABLE 1

| | |
|---|---|
| 1st | I, me, my, mine, myself, we, us, our, ours |
| 2nd | you, your, yours |
| 3rd | he, him, his, she, her hers, they, them, theirs |

Two key stylistic characteristics of narrative text are point of view and diegesis: respectively, whether the narrative recounts events personally or impersonally, and whether the narrator is involved in the events of the story. Interpreting a text's veridicality, correctly identifying the implication of its events, and properly delimiting the scope of its reference are all challenging and important problems that are critical to achieving complete automatic understanding of text. On the other hand, narrative text presents additional complications, in that to accomplish the tasks above, one must take into account the narrator's point of view (i.e., first person or third person), as well as the narrator's personal involvement in the story (herein referred to as "diegesis").

The point of view (POV) of a narrative is whether the narrator describes events in a personal or impersonal manner. There are, in theory, three possible points of view, corresponding to grammatical person; first, second, and third person. First person point of view involves a narrator referring to themselves, and implies a direct, personal observation of events. In a third person narrative, by contrast, the narrator is outside the story's course of action, looking in.

The narrator tells the reader what happens to the characters of the story without ever referring to the narrator's own thoughts or feelings.

In a second person narrative, the narrator tells the reader what he or she are feeling or doing, giving the impression that the narrator is speaking specifically to the reader him or herself and perhaps even controlling their actions. This is a relatively rare point of view (in a training corpus of English novels it occurred only once), and because of this we exclude it from consideration.

Knowing the point of view (first or third person) is important for understanding the implied veridicality as well as the scope of references within the text. Consider the following example text:

"John made everyone feel bad. He is a jerk." (1)

With regard to reference, if this is part of a first person narrative, the narrator is included in the scope of the pronoun everyone, implying that the narrator himself has been made to feel bad. In this case objectivity of the second sentence can be discounted if is known that the narrator feels bad on account of John. A third person narrator, by contrast, is excluded from the reference set, one can make no inference about this internal state and, thus, it does not affect the judgement of the implications of the accuracy or objectivity of later statements.

With regard to veridicality, if the narration is third person, statements of fact can be taken at face value with a higher default assumption of truthfulness. A first person narrator, in contrast, is experiencing the events not from an external, objective point of view, but from a personal point of view, and so assessment of the truth or accuracy of their statements is subject to the same questions as a second-hand report.

Diegesis can include a homodiegetic narrative, in which the narrator is involved or a heterodiegetic narrative in which the narrator is not involved in the story. A homodiegetic narrative includes a narrator that is not just the narrator but a character as well, performing actions that drive the plot forward. A heterodiegetic narrative includes a narrator who is observing the action, but not influencing its course. As reflected in Table 1, third person narrators are almost exclusively heterodiegetic, but first person narrators can be either. Like point of view, diegesis provides information to the reader on how to discount statements of fact, and so to judge the veridicality of the text.

Preprocessing can be the same for both point of view and diegesis. For example, the full text of the first 60 lines of a first chapter can be loaded into a string, and then all text within quotes can be deleted using a regular expression. For both POV and diegesis, the language spoken by narrator can be focused upon, whereas quoted text represents words can be associated with characters of the narrative. The benefits of removing the quoted text can be seen in at least Tables 3 and 4. After the quoted text is removed, the balance of the text can be tokenized and the sentence boundaries can be detected. Punctuation can be removed and upper case letters can be modified to lower case from the balance of the text after tokenization to produce an array of tokenized sentences, can be process for feature extraction.

Pronouns are a feature of diegesis and can help capture the relationship of the narrator to the story. If the narrator never refers to themselves in the text (i.e., a third person narrator), then it can be inferred that the narrator is acting in the capacity of a heterodiegetic narrator. First person narrators can be either homo- or hetero-diegetic. In this case, embodiments of the subject invention can count the number or type of pronouns that occur and analyze when first person pronouns, which represent the narrator, are used as arguments of verbs that represent events in the story. In order to accomplish these two objectives, embodiments of the subject invention provide software platforms configured to annotate text and provide semantic role labeling.

Embodiments of the subject invention provide a diegesis classifier configured to use occurrences of the first, second, and third person pronouns in addition to the features from the simple diegesis classifier as features, herein referred to as co-occurrences, as seen in Table 3.

Figure 2:
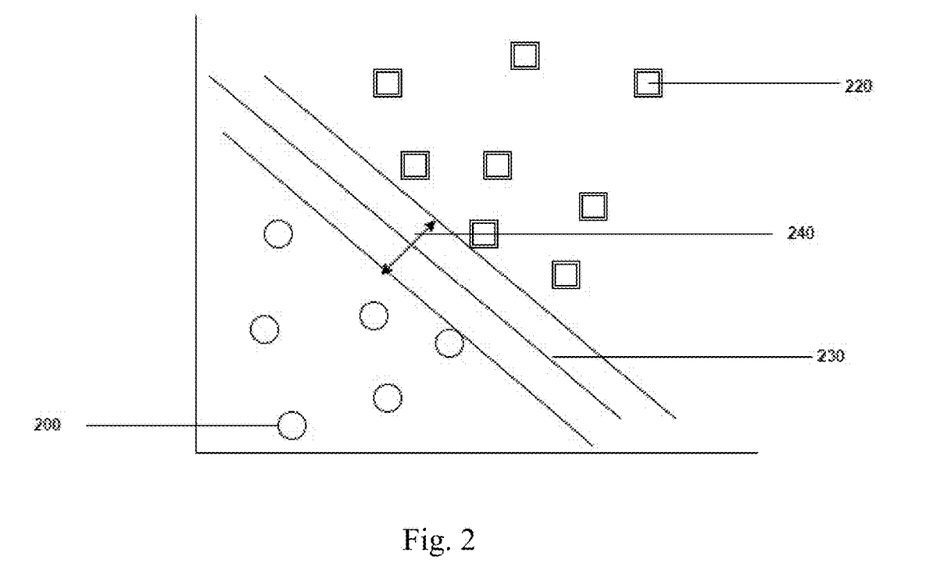
FIG. 2 is a plot illustrating a support vector machine.

Embodiments of the subject invention provide a support vector machine classifier. Referring to FIG. 2, a support vector machine is a discriminative classifier containing learning algorithms that can analyze the text data in the form of features vectors 200 and 220 to classify the text in terms of classes. The support vector machine can then establish an optimal hyperplane 230, which best separates the feature vectors 200 and 220. In order to describe the hyperplane 230, an input space can be mapped into a feature space. The optimal hyperplane is configured to provide a maximum margin 240 between hyperplane 230 and the closest element of each feature vector 200 and 220. The hyperplane 230 can be derived from support vectors (not shown in the figures) and described as an equation and scaled to suit a particular application. It should be appreciated by one of ordinary skill in the art, that although FIG. 2 presents a two dimensional illustration of a hyperplane, the SVM is capable of generating an N-dimensional hyperplane and configured in order to perform the methods that are described herein. Furthermore, the SVM can analyze patterns that are not linearly separable by transformations of original data to map into a new feature space, for example by using a kernel function.

Figure 3:
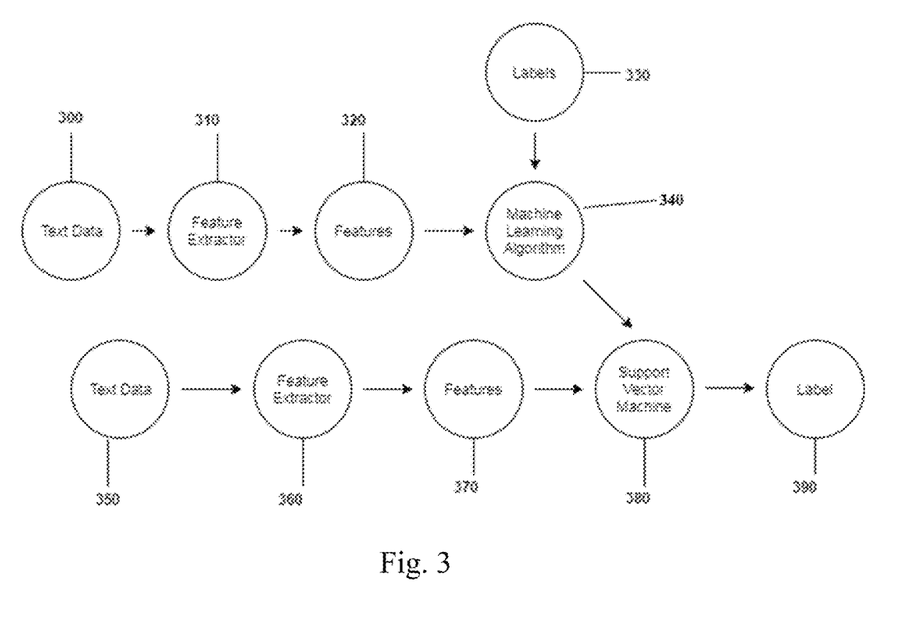
FIG. 3 is a flow diagram of a machine learning process flow.

As seen in FIG. 3, embodiments of the subject provide a support vector machine as a component of an overall machine learning architecture. The machine learning architecture can be subdivided into two phases—a training phase and a test phase. A processor in operable communication with a computer-readable medium can access a machine learning structure retained in the computer-readable medium. The processor can receive text data 300 with known labels from a plurality of sources, and the processor can extract the features 310 as provided in Table 1. The features 320 can be received and processed by a support vector machine model training algorithm 340. A user can provide labels, related to point of view and diegesis to the machine learning algorithm. The data can be processed and transmitted to the support vector machine which can label or annotate the data. This training process can repeated until the support vector machine 380 can accurately predict a label 390 for the data within an acceptable error range. After the machine learning software has been trained, arbitrary text data 350 can be transmitted to a feature extractor 360 and the extracted features 370 can be transmitted to a support vector machine model 380 for labeling. The performance of the point of view classification for different features sets can be seen in at least Table 2. The left hand column describes different sets of features used to train a support vector machine (SVM) classifier.

These features were extracted from the Corpus of English Novels. The columns to the right show the performance of each classifier when tested on CEN novels. Each data point is macro-averaged across the 10-folds of cross validation.

TABLE 2

| Feature Set | Quoted Text Removed | First Person | | | Third Person | | | Avg. |
|---|---|---|---|---|---|---|---|---|
| | | Precision | Recall | $F_1$ | Precision | Recall | $F_1$ | $F_1$ |
| Majority class baseline | | 0 | 0 | 0 | 0.724 | 1 | 0.839 | 0.607 |
| 3rd person pronouns only | ✓ | 0 | 0 | 0 | 0.73 | 0.994 | 0.842 | 0.61 |
| 2nd person pronouns only | ✓ | 0 | 0 | 0 | 0.745 | 0.984 | 0.848 | 0.615 |
| 2nd & 3rd person pronouns | ✓ | 0 | 0 | 0 | 0.735 | 0.979 | 0.839 | 0.608 |
| All pronouns | | 0.911 | 0.671 | 0.743 | 0.893 | 0.963 | 0.924 | 0.874 |
| 1st person pronouns | ✓ | 0.969 | 0.7 | 0.793 | 0.903 | 0.989 | 0..943 | 0.902 |
| 1st & 3rd person pronouns | ✓ | 0.955 | 0.729 | 0.808 | 0.911 | 0.984 | 0.945 | 0.907 |
| 1st & 2nd person pronouns | ✓ | 0.94 | 0.757 | 0.814 | 0.921 | 0.974 | 0.944 | 0.908 |
| All pronouns | ✓ | 0.944 | 0.814 | 0.859 | 0.938 | 0.973 | 0.954 | 0.928 |

Table 3 shows the performance of diegesis classification for different feature sets. These features were extracted from the Corpus of English Novels. The columns to the right show the performance of the each classifier when test novels from the Corpus of English Novels. Each data point is macro-averaged across the 10-fold of cross validation.

in the story. This focuses the classifier on places where the narrator is involved in driving the story forward, which is more closely aligned with the definition of diegesis. This can be accomplished by incorporating an automatic event detector

TABLE 3

| Feature Set | All Pronouns | Quoted Text Removed | Homodiegetic | | | Heterodiegetic | | | $F_1$ |
|---|---|---|---|---|---|---|---|---|---|
| | | | Precision | Recall | $F_1$ | Precision | Recall | $F_1$ | |
| Majority class baseline | | | 0 | 0 | 0 | 0.796 | 1 | 0.886 | 0.706 |
| 1st pers. pronoun as verb arg. | ✓ | | 0.805 | 0.5 | 0.586 | 0.892 | 0.962 | 0.924 | 0.852 |
| 1st pers. as arg. + co-occurence | ✓ | ✓ | 0.847 | 0.480 | 0.589 | 0.889 | 0.976 | 0.93 | 0.858 |
| 1st pers. pronoun as verb arg. | | ✓ | 0.907 | 0.58 | 0.677 | 0.91 | 0.981 | 0.943 | 0.886 |
| 1st pers. pronoun as verb arg. | ✓ | ✓ | 0.931 | 0.62 | 0.721 | 0.917 | 0.981 | 0.947 | 0.898 |

TABLE 4

| Corpus | # Texts | 1st Person | 3rd Person | Homo. | Heterodiegetic | Accuracy Estm. |
|---|---|---|---|---|---|---|
| Reuters-21578 | 19,043 | 1 (<1%) | 19,042 (~100%) | 1 (<1%) | 19042 (~100%) | 99%/99% |
| EurekAlert | 12,135 | 31 (<1%) | 12,104 (~100%) | 5 (<1) | 12,129 (~100%) | 97%/94% |
| CSC Extremist | 3,300 | 42 (1%) | 3.258 (99%) | 15 (<1%) | 3,285 (~100%) | 94%/92% |
| Lexis Nexis | 4,974 | 1,290 (26%) | 3,6114 (74%) | 818 (16%) | 4,156 (84%) | 70%/40% |
| Spinn3r | 201 | 133 (66%) | 68 (34%) | 67 (33%) | 134 (67%) | 42%/21% |

Embodiments of the subject invention can use uses the occurrence of all pronouns as features as a classifier for point of view. As seen in Table 2, empirical results provide a measure of the tests accuracy, $F_1$, as 0.859 for first person POV, and 0.954 for third person POV. The weighted average over the two classes is a 0.928 $F_1$.

Embodiments of the subject invention can count the first person pronouns as verb arguments as well as the occurrence of each pronoun as a classifier for diegesis. As seen in Table 3, Empirical results show an $F_1$ of 0.721 for homodiegetic and 0.947 for heterodiegetic. The weighted average over the two classes is a 0.898 $F_1$.

As seen in Table 2, the majority class baseline classifier has 0.607 $F_1$. As seen in Table 3, the majority baseline classifier for diegesis has 0.706 $F_1$, while the best diegesis classifier has 0.898 $F_1$.

In certain embodiments, pronoun argument detection can be restricted only to those verbs that actually indicate events In another embodiment of the subject invention, classifiers can be analyzed to detect if a narrative characteristic changes over the course of a text.

In yet another embodiment densities or ratios for the occurrences of the pronouns, instead of raw counts can be used for classifying texts, including short text that are for example, less than 60 lines long.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processer reads and executes the code and/or data stored on a computer-readable medium, the computer system and/or processer performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1

A method of classifying text, the method comprising:
providing a processor in operable communication with a (non-transitory) machine-readable medium (e.g., a (non-transitory) computer-readable medium) having instructions stored thereon, the instructions stored on the machine readable-readable medium, when executed, causing the processor to:
receive text data;
receive a plurality of features;
receive a plurality of labels;
remove quoted text from the text data;
remove punctuation characters from the text data;
convert upper case characters in the narrative text to lower case characters;
extract the features from the text data; and
predict a label for the text data.

Embodiment 2

The method of embodiment 1, further comprising separating each sentence from the text data and tokenizing the separated sentences (this can be performed by the processor, after being caused by the instructions).

Embodiment 3

The method of any of embodiments 1-2, a number of instances of each features being determined by converting each sentence in the text data into a parse tree, a semantic role labeler determines the number of instances of each feature in each parse tree.

Embodiment 4

The method of any of embodiments 1-3, a feature being the number of instances of a pronoun.

Embodiment 5

The method of any of embodiments 1-4, the plurality of features comprising the number of instances of at least one of the following words: "I"; "me"; "mine"; "myself"; "we"; "us"; and "ours".

Embodiment 6

The method of any of embodiments 1-5, the plurality of features further comprising the number of instances of at least one of following words "you"; "your"; and "yours".

Embodiment 7

The method of any of embodiments 1-6, the plurality of features further comprising the number of instances of at least one of the following words "he"; "him"; "his"; "she"; "her"; "hers"; "they"; "them"; and "theirs".

Embodiment 8

The method of any of embodiments 1-7, the labels comprising at least one of first person point of view and third person point of view.

Embodiment 9

The method of any of embodiments 1-9, further comprising: accessing a support vector machine contained in, or in operable communication with, the processor;
the support vector machine being configured to:
receive a plurality of feature vectors,
receive a plurality of labels;
generate support vectors from the plurality of feature vectors;
generate a hyperplane from the support vectors, the hyperplane being configured to provide a maximum margin between the hyperplane and the support vectors; associate a feature vector of the plurality of feature vectors with a label from the plurality of labels; and
predict a label from the plurality of labels to associate with an unlabeled feature vector.

Embodiment 10

The method of embodiment 9, the support vector machine being further configured to generate an N-dimensional hyperplane.

Embodiment 11

A method of classifying text, the method comprising:
providing a processor in operable communication with a (non-transitory) machine-readable medium (e.g., a (non-transitory) computer-readable medium) having instructions stored thereon, the instructions stored on the machine readable-readable medium, when executed, causing the processor to:
receive text data;
receive a set of labels;
remove quoted text from the text data;
remove punctuation characters from the text data;
convert upper case characters in the text data to lower case characters;
extract a set of features from the narrative text, the features comprising the number of instances of pronouns and the number of instances of a first person pronoun appearing in an argument of a verb; and predict a label from the plurality of labels to associate with an unlabeled feature vector.

Embodiment 12

The method of embodiment 12, further comprising separating each sentence from the narrative text; and tokenizing the separated sentences (this can be performed by the processor, after being caused by the instructions).

Embodiment 13

The method of any of embodiments 11-12, a number of instances of each features being determined by converting each sentence in the text data into a parse tree, and a semantic role labeler determining the number of instances of each feature in each parse tree.

Embodiment 14

The method of any of embodiments 11-13, the set of features comprising the number of instances of at least one of the following words: "I"; "me"; "mine"; "myself"; "we"; "us"; and "ours".

Embodiment 15

The method of any of embodiments 11-14, the set of features further comprising the number of instances of at least one of following words "you"; "your"; and "yours".

Embodiment 16

The method of any of embodiments 11-15 the set of features further comprising the number of instances of at least one of the following words "he"; "him"; "his"; "she"; "her"; "hers"; "they"; "them"; and "theirs".

Embodiment 17

The method of any of embodiments 11-16, the labels comprising at least one of first person point of view and third person point of view.

Embodiment 18

The method of any of embodiments 11-17, the labels comprising at least one of homodiegetic and heterodiegetic, and homodiegetic representing a narrator being personally involved in the text data, and heterodiegetic representing a narrator personally uninvolved in the text data.

Embodiment 19

The method of any of embodiments 11-18, further comprising:

accessing a support vector machine contained in, or in operable communication with, the processor;

the support vector machine being configured to:
receive a plurality of feature vectors,
receive a plurality of labels;
generate support vectors from the feature vectors;
generate a hyperplane from the support vectors, the hyperplane being configured to provide a maximum margin between the hyperplane the support vectors;
associate a feature vector of the plurality of feature vectors with a label; and
predict a label from the plurality of labels to associate with an unlabeled feature vector.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

A fully automatic pipeline for extracting the narrative point of view of a text was made and tested in the Java language. A prototype was coded in Java. The system extracted the values of the features from plain text. A pilot annotation study to generate 30 training examples was conducted. A gold-standard annotation study was conducted where 270 texts were annotated for their point of view content. Finally, the gold-standard annotations were used to train the final support vector machine based classification model.

An SVM was trained with labeled data from the first page of 270 different novels from the Corpus of English Novels. The labeled training data was produced in a gold standard annotation study. The values of the 22 features from each text were automatically extracted and used this to train a SVM model. 10-fold cross validation was used to evaluate the performance of the diegesis classifier and support claims that the SVM model is accurate.

To determine the best sets of features for classification, two experiments, one each for POV and diegesis were conducted. In each case, texts were preprocessed as described herein and various features were extracted as described herein. Then the corpus training and testing sets were partitioned using ten-fold cross-validation. For POV, the texts annotated as first person were divided into ten sets containing nearly equal numbers of texts, and the same for the third person texts. Then the first set of both the first person and third person texts were designated as the test sets and the classifier was trained on the remaining nine sets from each class. This was repeated with each set (second, third, fourth, etc.) designated each set in order as the test set, with the remaining sets used for training. There are more third person narrators in the corpus; hence, each training fold has more examples of third person narrators than first person narrators. Cross-validation for diegesis in the same manner.

A support vector machine (SVM) classifier was trained using specific features as described below. To evaluate performance of the classifiers macro-averaged precision, recall, and $F_1$ measure were reported. This was done by averaging, without any weighting, the precision, recall, and $F_1$ for overall performance (weighted by number of texts).

A list of the sets of first, second, and third person pronouns used as features can be found in Table 1.

Eight different features sets for POV classification were investigated. The classifier that uses counts of the first, second, and third person pronouns as the feature set provided strong empirical performance. Six of the remaining experiments used different subsets of the pronouns. The performance on each individual set of pronouns was tested as well as each combination of two pronouns sets. The classifier that considers all three types of pronouns has an $F_1$ of almost six percentage points higher than the classifier that only considered first person pronouns.

Example 2

In order to demonstrate the effect on point of view classification of removing quoted text before the features are extracted the following experiment was conducted. In one experiment, the quoted text was not removed in preprocessing, and then all pronouns were used as in the best performing classifier. This negatively impacted $F_1$ for the first person narrators by 13 percentage points and the $F_1$ for third person narrators by about 3 percentage points. This shows that it is important to remove quoted text before extracting features for POV classification. The only feature sets that did worse than the feature set with quoted text removed were those feature sets that did not include first person pronouns.

In order to demonstrate the effect on diegesis classification of removing quoted text before the features are extracted the following experiment was conducted. A feature set from a diegesis classifier (with first person pronouns as arguments to a verb, and the occurrences of all pronouns), was chosen and the quoted text removal operation was taken out from the pipeline. This caused the $F_1$ measure to drop over 13 percentage points for homodiegetic and approximately 2 percentage points for heterodiegetic. These drops in performance indicate that the classifier performs better when quoted text is removed.

Example 3

A corpus of diverse texts annotated for point of view and diegesis was chosen to train teach the machine learning software. The Corpus of English Novels, which contains 292 English novels published between 1881 and 1992, and was assembled to represent approximately a generation of writers from turn-of-the-century English literature was used for training purposes. Novels were includes in the corpus if they were available freely from Project Gutenberg when the corpus was assembled in 2007. There are twenty-five authors represented in the corpus, including, for example, Arthur Conan Doyle, Edith Wharton and Robert Louis Stevenson. Genres represented span a wide range including drama, fantasy, adventure, historical fiction, and romance.

To simulate "the first page" of each novel, each text file was manually trimmed so that they started with the beginning of the first chapter down to the first 60 lines, as defined by the line breaks in the original files (which reflect the Gutenberg project's typesetting). These shortened texts were used by the annotators, and were the data on which the classifiers were trained and tested.

An annotation guide was written for point of view and diegesis. The first 20 books of the corpus were used to train the annotators, and the remaining 272 texts were annotated by the annotators. As a result, a gold-standard corpus of 270 novels annotated for point of view and diegesis was produced.

The inter-annotator agreement using Cohen's kappa coefficient (k) was evaluated. For point of view, the k was 0.635 and the k for diegesis is 0.592. Out of 270 markings, there were 36 and 33 conflicts between the annotators for POV and diegesis respectively. The first author resolved the conflicts in the POV and diegesis annotations by reading the text and determined the correct characteristic according to the annotation guide. Table 5 shows the distribution of the texts in the corpus across the various categories. Of the 270 texts in the corpus, 74 had first person narrators, only 1 had second person, and 195 were third person. For diegesis, 55 were homodiegetic and 215 were heterodiegetic. There was only one second person narrator; this type of narrator is atypical in narrative texts in general, and was excluded this text from training and testing.

TABLE 5

|  | First | Second | Third |
|---|---|---|---|
| Homodiegetic | 54 (20%) | 1 (0.4%) | — |
| Heterodiegetic | 20 (7.4%) | — | 195 (72.2%) |

There are no third person homodiegetic texts in the training corpus. Although in principle this is possible, it is narratively awkward, requires the narrator to be involved in the action of the story (homodiegetic), but report the events from a dispassionate, third-person point of view, never referring to him or herself directly. The data implies that this type of narrator is, at the very least, rare in turn of the century English literature. Preprocessing, SVM training, cross-validation testing, and feature extraction for the classifiers were implemented in Java.

Example 4

To reveal the relationship of POV and diegesis to news story genres, both classifiers were applied to a diverse set of news corpora. The classifiers for these experiments were trained on all 269 first and third person texts from the CEN, using the best performing sets of features. Classifiers were applied to texts drawn from five corpora: the Reuters-21578 newswire corpus, a corpus of scientific press releases scraped from EurekAlerts, a selection of opinion and editorial articles scraped from LexisNexis, the Spinn3r web blog corpus, and the CSC Islamist Extremist corpus containing ideological storytelling, propaganda, and wartime press releases. These five corpora were used for testing the POV and diegesis classifiers; these corpora are not used for training the classifiers. For each experiment, the best set of POV and diegesis features were used to train a classifier, these classifiers were trained on the first page of each novel from the CEN. For each corpora, after running the classifiers texts were randomly sampled and checked their classification to produce an estimate of the true accuracy of the classifiers. Sample sizes were determined by calculating the number of samples required to achieve a 99% confidence for a point estimate of proportion, using the proportion estimated by the classifier. In all cases the ratio of first person to third person texts (and homo- to hetero-diegetic texts) was chosen to be equal to the ratio in the classification.

Example 5—Reuters-21578 Newswire

This corpus contains 19,043 texts, and all but one were marked by the classifiers as third person and heterodiegetic. This result can be expected, as journalists typically use the third person POV and heterodiegetic narration to communicate objectivity.

The erroneous classification of one text as first person was the result of a type of language we did not anticipate. The article in question uses direct speech to quote a letter written by Paul Volcker, Federal Reserve Board chair, to President Ronald Reagan. The majority of the article is the text of the letter, where Volcker repeatedly refers to himself, using the pronoun "I." The POV classifier interpreted this document as first person because the text of Volcker's letter was not removed in the quotation removal phase. The letter was not removed in the quotation removal phase. The letter is quoted using direct speech, which a simple, regular-expression-based quotation detection system cannot recognize.

To estimate the true accuracy of the POV classifier over the Reuters corpus the POV of 200 texts (including the single first person text) were randomly sampled and checked. All of the classifications were correct except the single first person text, resulting in an accuracy estimate of 99.5% over the newswire text for the POV classifier (1.3% margin of error at 99% confidence).

To estimate the true accuracy of the diegesis classifier over this corpus we randomly sampled and checked the diegesis of 200 texts (including the single homodiegetic text). Of the 199 heterodiegetic texts, all were correct, while the single homodiegetic text was incorrect, resulting in an accuracy estimate of 99% for the diegesis classifier over the newswire text (1.81% margin of error at 99% confidence).

Example 6—EurekAlert Press Releases

This corpus contains 12,135 texts scraped from the EurekAlert, dated between Jun. 1st and Dec. 31, 2009. The distribution of this corpus is similar to the Reuters corpus, and over 99% of the texts were classified as third person and heterodiegetic narrations. Press offices write press releases to entice journalists to write newswire articles, and so it makes sense that they will attempt to mimic the desired narrative distance in the press release, seeking to present themselves as unbiased narrators.

To estimate the true accuracy of the POV classifier over the press releases we randomly sampled and checked the diegesis of 120 texts, including two first person and 118 third person. Of the two first person texts, one was correct, and of the 118 third person texts, 115 were correct, resulting in an accuracy estimate for the POV classifier of 97% over the press release text (4.03% margin of error at 99% confidence).

To estimate the true accuracy of the diegesis classifier over this corpus we randomly sampled and checked the diegesis of 120 texts, including 2 homodiegetic and 118 heterodiegetic. Of the two homodiegetic texts, neither were correct, and of the 118 heterodiegetic texts, 111 were correct, resulting in an accuracy estimate for the diegesis classifier of 94% over the press release text (5.6% margin of error at 99% confidence).

Example 7—LexisNexis Opinions and Editorials

This corpus comprises 4,974 texts labeled opinion or editorial scraped from the LexisNexis website, dated between January 2012 and August 2016. Texts were included if they contained more than 100 words and appeared in one of a set of major world publications including, for example, the New York Times, the Washington Post, and the Wall Street Journal. About one-quarter of these texts are first person, and more than half of the first person narrators were homodiegetic. The increased abundance of first person and homodiegetic texts can be expected as the purpose of these types of articles is often to express individual opinions or the writer's person experience of events.

To estimate the true accuracy of the POV classifier over the LexisNexis articles, the POV of 200 texts were randomly sampled and checked, 50 from those classified as first person and 150 from those classified as third person. Of the 50 texts classified as first person all were confirmed correct, while of the 150 texts classified as third person only 90 were confirmed correct. This suggests that the classifier is not properly identifying all of the first person narrator in the Lexis-Nexis corpus, and results in an accuracy estimate of 70% for the POV classifier over the LexisNexis texts (2.7% margin of error at 99% confidence).

To estimate the true accuracy of the diegesis classifier over this corpus we randomly sampled and checked the diegesis of 200 texts, including 24 homodiegetic and 126 heterodiegetic texts. Of the 24 homodiegetic texts, all were correct, and of the 126 heterodiegetic texts, 51 were correct, allowing us to estimate that the diegesis classifier has an accuracy of 40% over the press release text (11% margin of error at 99% confidence).

Example 8—Spinn3r Web Blogs

This corpus comprises 201 stories extracted by Gordon and Swanson (2009) from the Spinn3r 2009 Web Blog corpus (Burton et al., 2009). These texts come from web blogs, where people often tell personal stories from their perspective, or use the blog as a public journal of their daily life. In contrast with newswire text, there is no expectation that a blog will report the truth in an unbiased manner. The distribution of the POV on this corpus reflects this tendency, with 66% of the texts being first person.

The diegesis distribution for the web blog stories was not unexpected: slightly more than half of the blog stories with first person narrators are homodiegetic. These are the most personal stories of the web blog story corpus, in which the narrator is involved in the story's action.

To estimate the true accuracy of the POV classifier on the Spinn3r corpus, 20 texts were randomly sampled, 13 from those classified as first person and 7 classified as third person. Of the 13 first person texts, 9 were confirmed correct, while of the 7 third person texts only 3 were confirmed correct. Overall, the classifier has trouble classifying the web blog texts. This might be due to syntactic irregularities of blog posts, which vary in their degree of adherence to proper English grammar. With respect to third person narrators the POV classifier is estimated to have an accuracy of 42% over the web blog text (34% margin of error at 99% confidence).

To estimate the true accuracy of the diegesis classifier over this corpus the diegesis of 20 texts were randomly sampled and checked, including six homodiegetic and 14 heterodiegetic texts. Of the six homodiegetic texts, all were correct, and of the 14 heterodiegetic texts, three were correct. With respect to the heterodiegetic narrators the diegesis classifier is estimated to have an accuracy of 21% over the press release text (27% margin of error at 99% confidence).

Example 9—Islamic Extremist Texts

The CSC Islamist Extremist corpus contained 3,300 story texts, as identified by Corman et al. (2012). These texts were original posted on Islamist Extremist websites or forums. The POV classifier found that 99.7% of the extremist stories were written in the third person. For the most part, the extremist stories were second hand accounts of events, often to share news about the outcome of battles or recount the deeds of Jihadists.

To estimate the true accuracy of the POV classifier on this corpus, 150 texts were randomly sampled, 2 from those classified as first person, and 148 classified as third person.

Both of the texts classified as first person were verified to be first person narrators. Of the 148 texts classified as third person, 139 were verified correct. With respect to third person narrators, the classifier has an estimated accuracy of 93.9% over the extremist texts (4.92% margin of error at 99% confidence).

To estimate the true accuracy of the diegesis classifier over this corpus the diegesis of 150 texts were randomly sampled and checked, including 2 homodiegetic and 148 heterodiegetic texts. Of the 2 homodiegetic texts, 1 was correct, and of the 148 heterodiegetic texts, 137. With respect to the heterodiegetic narrators, we can estimate the classifier has an accuracy of 92% over the press release text (5.6% margin of error at 99% confidence).

Example 10

Automatic classifiers for point of view and diegesis, were developed and the performance of different feature sets for both were compared. A gold-standard corpus was built wherein the corpus was double-annotated to substantial agreement (k>0.59) 270 English novels for point of view and diegesis. Personal pronouns comprise the best features for point of view classification achieving an average $F_1$ of 0.928. For diegesis, the best features were personal pronouns and the occurrences of first person pronouns in the argument of verbs, achieving an average $F_1$ of 0.898. The classifier was applied to nearly 40,000 news texts across five different corpora, large sets of texts, comprising multiple genres (including newswire, opinion, blog posts, and scientific press releases). The experiment showed that the point of view and diegesis correlates largely as expected with the nominal genre of the texts.

The experiment established a high performing classifier for point of view with 0.928 $F_1$, and a good classifier for diegesis with 0.898 $F_1$. To evaluate the classifiers a double annotated corpus was created with gold-standard annotations for point of view and diegesis-based on the first 60 lines-of 270 English novels. These classifiers were applied to almost 40,000 news story texts drawn from five different corpora, and show that the classifiers remain highly accurate and that the proportions of POV and diegesis they identify correlated in an expected way with the genre of the news texts.

Example 11

Annotators marked narrative POV and diegesis from the first 60 lines of each of 270 English novels, which is a generous simulation of "the first page." The collection of data was transformed for supervised machine learning from an unmanageable burden (i.e., having annotators read every novel from start to finish) into a tractable task (reading only the first page). Novels were chosen for training, instead of news texts themselves, because of the novels' greater diversity of language and style.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] [Aufderheide 1997], Public Intimacy: The Development of First-Person Documentary, Aufderheide, Patricia, 1997, Afterimage: The Journal of Media Arts and Cultural Criticism, 25(1):16-18.

[2] [Bal 2009], Narratology: Introduction to the Theory of Narrative, Bal, Mieke, 2009, University of Toronto Press, Toronto.

[3] [Burton et al. 2009], The {ICWSM} 2009 Spinn3r Dataset, Burton, Kevin and Java, Akshay and Soboroff, Ian, 2009.

[4] [Ceran et al. 2009], Proceedings of the 3rd Annual Conference on Weblogs and Social Media (ICWSM 2009), San Jose, Calif., In proceeding A Hybrid Model and Memory Based Story Classifier, Proceedings of the 3rd International Workshop on Computational Models of Narrative (CMN'12), Ceran, Betul and Karad, Ravi and Corman, Steven and Davulcu, Hasan, Istanbul, Turkey, pages 60-64.

[5] [Chang and Lin 2001], LIBSVM: A Library for Support Vector Machines, Chang, Chih-Chung and Lin, Chih-Jen, 2011, ACM Transactions on Intelligent Systems and Technology (TIST), 2(3), 1-27.

[6] [Davison 1983], The Third-Person Effect in Communication, Davison, W. Phillips, 1983, Public Opinion Quarterly, 47(1): 1-15.

[7] [Desmet 2008] Corpus of English Novels, De Smet, Hendrik, 2008, https://protect-us.mimecast.com/s/zNk-vBNfMANI2.

[8] [Devore 2011], Probability and Statistics for Engineering and the Sciences, Devore, Jay L., 2011, $8^{th}$ edition, Cengage Learning, Boston, Mass.

[9] [Finlayson 2008], Collecting Semantics in the Wild: The Story Workbench, Finlayson, Mark A., 2008, Proceedings of the AAAI Fall Symposium on Naturally Inspired Artificial Intelligence (NIAI), Arlington, Va., pages 46-53.

[10] [Finlayson 2011], The Story Workbench: An Extensible Semi-Automatic Text Annotation Tool, Finlayson, Mark A., 2011, Proceedings of the 4th Workshop on Intelligent Narrative Technologies (INT4), Stanford, Calif., pages 21-24.

[11] [Gordon and Swanson 2009], Identifying Personal Stories in Millions of Weblog Entries, Gordon, Andrew and Swanson, Reid, 2009, Proceedings of the 3rd International Conference on Weblogs and Social Media (ICWSM 2009), Data Challenge Workshop, San Jose, Calif.

[12] [Hart 1971], Project Gutenberg, Hart, Michael, 1971, https://protect-us.mimecast.com/s/rxdvBxf5AQuO.

[13] [Landis and Kock 1977], Landis, Richard and Koch, Gary, The Measurement of Observer Agreement for Categorical Data, 1977, Biometrics, 33(1), pages 159-174.

[14] [Mani 2012], Computational Modeling of Narrative, Mani, Inderjeet, 2012, Morgan & Claypool Publishers, Williston, V T.

[15] [Manning et al. 2014], The Stanford CoreNLP Natural Language Processing Toolkit, Manning, Christopher D and Surdeanu, Mihai and Bauer, John and Finkel, Jenny Rose and Bethard, Steven and McClosky, David, 2014, Proceedings of the 52nd Annual Meeting of the Association for Computational Linguistics, System Demonstrations, Baltimore, Md., pages 55-60.

[16] [Sagae et al. 2013], A Data-Driven Approach for Classification of Subjectivity in Personal Narratives, Sagae, Kenji and Gordon, Andrew and Dehghani, Morteza and Metke, Mike and Kim, Jackie and Gimbel, Sarah and Tipper, Christine and Kaplan, Jonas and Immordino-Yang, Mary Helen, 2013, Proceedings of the 5th International Workshop on Computational Models of Narrative (CMN'13), Hamburg, Germany, pages 198-213.

[17] [Verhagen et al. 2007], SemEval}-2007 Task 15: TempEval Temporal Relation Identification, Verhagen, Marc and Gaizauskas, Robert and Schilder, Frank and Hepple, Mark and Katz, Graham and Pustejovsky, James, 2007, Proceedings of the 4th International Workshop on Semantic Evaluations (SemEval-2007), Prague, Czech Republic, pages 75-80.

[18] [Wiebe 1994], Tracking Point of View in Narrative, Wiebe, Janyce M, 1994, Computational Linguistics, 20(2), pages 233-287.

What is claimed is:

1. A computer-based system of predicting a narrative point of view of text data, the system comprising:
  a receiving device configured to receive text data;
  a non-transitory computer-readable medium comprising natural language processing code stored thereon that, when executed, cause a processor to:
    receive, by the receiving device, text data;
    perform feature extraction using feature extraction code, by performing the following:
      remove quoted text and punctuation characters from the text data;
      convert upper case characters in the text data to lower case characters;
      extract each pronoun contained in the text data and a respective number of instances of each pronoun;
      insert a respective number of instances of each pronoun into a feature vector; and
    predict, by support vector machine code, a narrative point of view of the text data based upon the extracted pronouns and the respective number of instances of each pronoun,
    wherein each pronoun comprises one of the following: "I", "me", "my", "mine", "myself", "we", "us", "our", "ours", "you", "your", "yours", "he", "him", "his", "she", "her", "hers", "they", "them", and "theirs", and
    wherein the support vector machine code is trained to predict the narrative point of view of the text data based upon the pronouns and the respective number of instances of each pronoun.

2. The system of claim 1, the non-transitory computer-readable medium having instructions comprising natural language processing code stored thereon that, when executed, further cause the processor to separate each sentence from the text data and tokenize the separated sentences.

3. The system of claim 1, the non-transitory computer-readable medium having instructions comprising natural language processing code stored thereon that, when executed, further cause the processor to determine the respective number of instances of each pronoun by converting each sentence in the text data into a parse tree; and further comprising a semantic role labeler for determining the respective number of instances of each pronoun in each parse tree.

4. The system of claim 1, the labels comprising: "first person point of view" and "third person point of view".

5. The method of claim 1, the non-transitory computer-readable medium having instructions comprising natural language processing code stored thereon that, when executed, further cause the processor to:
  access a support vector machine contained in, or in operable communication with, the processor;
  the support vector machine being configured to:
    receive a plurality of feature vectors,
    receive a plurality of labels;
    generate support vectors from the plurality of feature vectors;
    generate a hyperplane from the support vectors, the hyperplane being configured to provide a maximum margin between the hyperplane and the support vectors;
    associate each feature vector of the plurality of feature vectors with a label; and
    predict a label from the plurality of labels to associate with an unlabeled feature vector.

6. The method of claim 5, the support vector machine being further configured to generate an N-dimensional hyperplane.

7. A computer-based system of predicting a diegesis of text data, the system comprising:
  a receiving device configured to receive text data;
  a non-transitory computer-readable medium comprising natural language processing code stored thereon that, when executed, cause a processor to:
    receive, by a receiving device, text data;
    perform feature extraction using feature extraction code, by performing the following:
      remove quoted text and punctuation characters from the text data;
      convert upper case characters in the narrative text to lower case characters;
      extract each pronoun contained in the text data, a respective number of instances of each pronoun, and a respective number of instances of each first person pronoun appearing in an argument of a verb;
      insert each the respective number of instances of each pronoun and the respective number of instances of each first person pronoun appearing in an argument of a verb into a feature vector; and
    predict, by support vector machine code, a diegesis of the text data based upon the extracted pronouns, the respective number of instances of each pronoun, and the respective number of instances of each first person pronoun appearing in an argument of a verb,
    wherein each pronoun comprises one of the following: "I", "me", "my", "mine", "myself", "we", "us", "our", "ours", "you", "your", "yours", "he", "him", "his", "she", "her", "hers", "they", "them", and "theirs", and
    wherein the support vector machine code is trained to predict the diegesis of the text data based upon the pronouns, the respective number of instances of each pronoun, and the respective number of instances of each first person pronoun appearing in an argument of a verb.

8. The system of claim 7, the non-transitory computer-readable medium having instructions comprising natural language processing code stored thereon that, when executed, cause the processor to separate each sentence from the narrative text and tokenize the separated sentences.

9. The system of claim 7, the non-transitory computer-readable medium having instructions comprising natural language processing code stored thereon that, when executed, cause the processor to determine a respective number of instances of each pronoun by converting each sentence in the text data into a parse tree, and further comprising a semantic role labeler for determining the respective number of instances of each pronoun in each parse tree.

10. The system of claim 7, the labels comprising "first person point of view" and "third person point of view".

11. The system of claim 10, the labels further comprising homodiegetic and heterodiegetic, homodiegetic representing a narrator being personally involved in the narrative text, and heterodiegetic representing a narrator personally uninvolved in the narrative text.

12. The system of claim 7, the non-transitory computer-readable medium having instructions comprising natural language processing code stored thereon that, when executed, cause the processor to:
    access a support vector machine contained in, or in operable communication with, the processor;
    the support vector machine being configured to:
    receive a plurality of feature vectors,
    receive a set of labels;
    generate support vectors from the plurality of feature vectors; generate a hyperplane from the support vectors, the hyperplane being configured to provide a maximum margin between hyperplane and the support vectors; associate a feature vector of the plurality of feature vectors with a label; and
    predict a label from the plurality of labels to associate with an unlabeled feature vector.

13. A non-transitory computer-readable medium having stored thereon that, when executed, cause a processor to:
    receive text data;
    remove quoted text and punctuation characters from the text data;
    separate each sentence from the text data;
    tokenize the separated sentences;
    convert upper case characters in the text data to lower case characters;
    extract pronouns from the text data, each respective pronoun comprising one of the following: "I", "me", "mine", "myself", "we", "us", "ours", "you", "your", "yours", "he", "him", "his", "she", "her", "hers", "they", "them", and "theirs", a respective number of instances of each pronoun, and a respective number of instances of each first person pronoun appearing in an argument of a verb;
    receive a plurality of labels, the labels comprising first person point of view, third person point of view, homodiegetic, and heterodiegetic, homodiegetic representing a narrator being personally involved in the narrative text, and heterodiegetic representing a narrator personally uninvolved in the narrative text;
    insert each the respective number of instances of each pronoun and the respective number of instances of each first person pronoun appearing in an argument of a verb into a respective feature vector; and
    access a support vector machine contained in, or in operable communication with, the processor,
    the support vector machine being configured to:
        receive a plurality of feature vectors,
        receive the plurality of labels;
        generate support vectors from the set plurality of feature vectors;
        generate a hyperplane from the support vectors, the hyperplane being configured to provide a maximum margin between the hyperplane the support vectors;
        associate a feature vector of the plurality of feature vectors with a label; and
        predict a label from the plurality of labels to associate with an unlabeled feature vector.

\* \* \* \* \*

UNITED STATES PATENT AND TRADEMARK OFFICE
CERTIFICATE OF CORRECTION

PATENT NO. : 10,191,975 B1
APPLICATION NO. : 15/804589
DATED : January 29, 2019
INVENTOR(S) : Eisenberg et al.

It is certified that error appears in the above-identified patent and that said Letters Patent is hereby corrected as shown below:

Please delete Patent No. 10,191,975 B1 in its entirety and insert Patent No. 10,191,975 B1 in its entirety as shown on the attached pages Signed and Sealed this
Second Day of April, 2019

Andrei Iancu
*Director of the United States Patent and Trademark Office*

(12) United States Patent
Eisenberg et al.

(10) Patent No.: US 10,191,975 B1
(45) Date of Patent: Jan. 29, 2019

(54) FEATURES FOR AUTOMATIC CLASSIFICATION OF NARRATIVE POINT OF VIEW AND DIEGESIS

(71) Applicants: Joshua Daniel Eisenberg, Miami, FL (US); Mark Finlayson, North Bay Village, FL (US)

(72) Inventors: Joshua Daniel Eisenberg, Miami, FL (US); Mark Finlayson, North Bay Village, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/804,589

(22) Filed: Nov. 6, 2017

(51) Int. Cl.
G06F 17/27 (2006.01)
G06F 17/30 (2006.01)
G06F 17/24 (2006.01)
G06F 17/21 (2006.01)

(52) U.S. Cl.
CPC ...... *G06F 17/30707* (2013.01); *G06F 17/218* (2013.01); *G06F 17/24* (2013.01); *G06F 17/274* (2013.01); *G06F 17/2705* (2013.01); *G06F 17/277* (2013.01); *G06F 17/2785* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795

USPC .................................................... 704/1, 9, 10
See application file for complete search history.

(56) References Cited

U.S. PATENT DOCUMENTS

| | | | |
|---|---|---|---|
| 6,199,034 B1 * | 3/2001 | Wical | G06F 17/2785 704/9 |
| 7,779,049 B1 * | 8/2010 | Phillips | G06F 17/3064 707/809 |
| 8,972,265 B1 * | 3/2015 | Lester | G10L 13/00 704/246 |
| 9,773,166 B1 * | 9/2017 | Connor | G06F 17/271 |
| 2005/0108630 A1 * | 5/2005 | Wasson | G06F 17/241 715/230 |
| 2009/0100454 A1 * | 4/2009 | Weber | G11B 27/034 725/9 |
| 2009/0124272 A1 * | 5/2009 | White | G10L 15/193 455/466 |
| 2010/0218094 A1 * | 8/2010 | Ofek | A63F 13/12 715/706 |

(Continued)

OTHER PUBLICATIONS

Kudo et al., Chunking with Support Vector Machines, 2001, NAACL, ACL. pp. 1-8.*

(Continued)

*Primary Examiner* — Lamont M Spooner
(74) *Attorney, Agent, or Firm* — Saliwanchik, Lloyd & Eisenschenk

(57) ABSTRACT

Methods for classifying a point of view and diegesis are provided. A method can include providing a processor in operable communication with a computer-readable medium, receiving a narrative text, extracting a set of features from the narrative text, transmitting the features into a feature vector, transmitting a plurality of feature vectors to a support vector machine, predicting a point of view and diegesis for the narrative text associate with a particular feature vector, and annotating the narrative text.

13 Claims, 3 Drawing Sheets

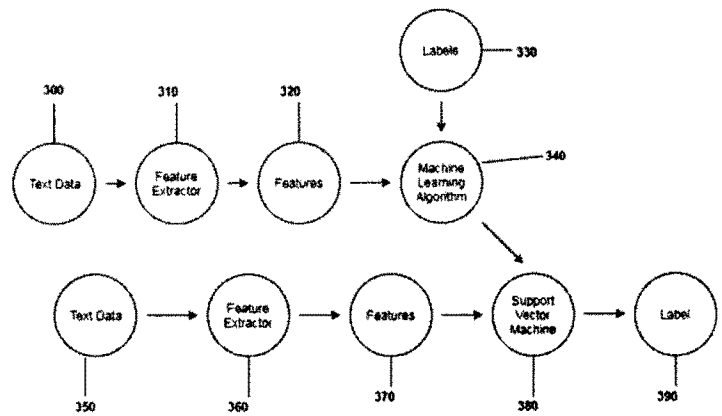

(56) References Cited

U.S. PATENT DOCUMENTS

| | | | |
|---|---|---|---|
| 2012/0036130 A1* | 2/2012 | Light | G06F 17/278 707/736 |
| 2013/0138435 A1* | 5/2013 | Weber | G06F 17/21 704/231 |
| 2013/0179169 A1* | 7/2013 | Sung | G06F 17/27 704/254 |
| 2014/0095418 A1* | 4/2014 | Scholand | G06F 17/279 706/46 |
| 2014/0195884 A1* | 7/2014 | Castelli | G06F 17/278 715/201 |
| 2014/0236578 A1* | 8/2014 | Malon | G06F 17/28 704/9 |
| 2015/0120756 A1* | 4/2015 | Grunick | G06F 17/30876 707/748 |
| 2015/0332665 A1* | 11/2015 | Mishra | G10L 15/1815 704/257 |
| 2016/0111016 A1* | 4/2016 | Govindaraj | G09B 19/00 434/156 |
| 2017/0024375 A1* | 1/2017 | Hakkani-Tur | G06F 17/2785 |
| 2017/0161372 A1* | 6/2017 | Fern ndez | G06F 17/218 |
| 2017/0323011 A1* | 11/2017 | Byron | G06F 17/30675 |

OTHER PUBLICATIONS

Eisenberg et al., Automatic Identification of Narrative Diegesis and Point of View, Nov. 5, 2016, ACL, pp. 36-46.*

Aufderheide, "Public intimacy: the development of first-person documentary," Afterimage: The Journal of Media Arts and Cultural Criticism, Jul. 1997, pp. 1-13.

Ceran et al., "A hybrid model and memory based story classifier," The Third Workshop on Computational Models of Narrative, May 2012, pp. 58-62.

Chang et al., "LIBSVM: a library for support vector machines," ACM Transactions on Intelligent Systems and Technology, Apr. 2011, pp. 1-39.

Davison, "The third-person effect in communication," The Public Opinion Quarterly, Jan. 1983, pp. 1-15, vol. 47, No. 1.

Finlayson, "Collecting semantics in the wild: the story workbench," Proceedings of the AAAI Fall Symposium on Naturally Inspired Artificial Intelligence, Nov. 2008, pp. 1-8.

Finlayson, "The story workbench: an extensible semi-automatic text annotation tool," Proceedings of the Fourth Workshop on Intelligent Narrative Technologies, Oct. 2011, pp. 21-24.

Gordon et al., "Identifying personal stories in millions of weblog entries," Proceedings of the Third International Conference on Weblogs and Social Media, May 2009, pp. 1-8.

Landis et al., "The measurement of observer agreement for categorical data," Biometrics, Mar. 1977, pp. 159-174, vol. 33, No. 1.

Manning et al., "The stanford coreNLP natural language processing toolkit," Proceedings of the 52nd Annual Meeting of the Association for Computational Linguistics, Jun. 2014, pp. 1-6.

Sagae et al., "A data-driven approach for classification of subjectivity in personal narratives," Proceedings of the 2013 International Workshop on Computational Models of Narrative, Aug. 2013, pp. 198-213.

Verhagen et al., "SemEval-2007 Task 15: TempEval temporal relation identification," Proceedings of the 4th International Workshop on Semantic Evaluations, Jun. 2007, pp. 75-80.

Wiebe, "Tracking point of view in narrative," Computational Linguistics, Jun. 1994, pp. 233-287, vol. 20, No. 2.

* cited by examiner

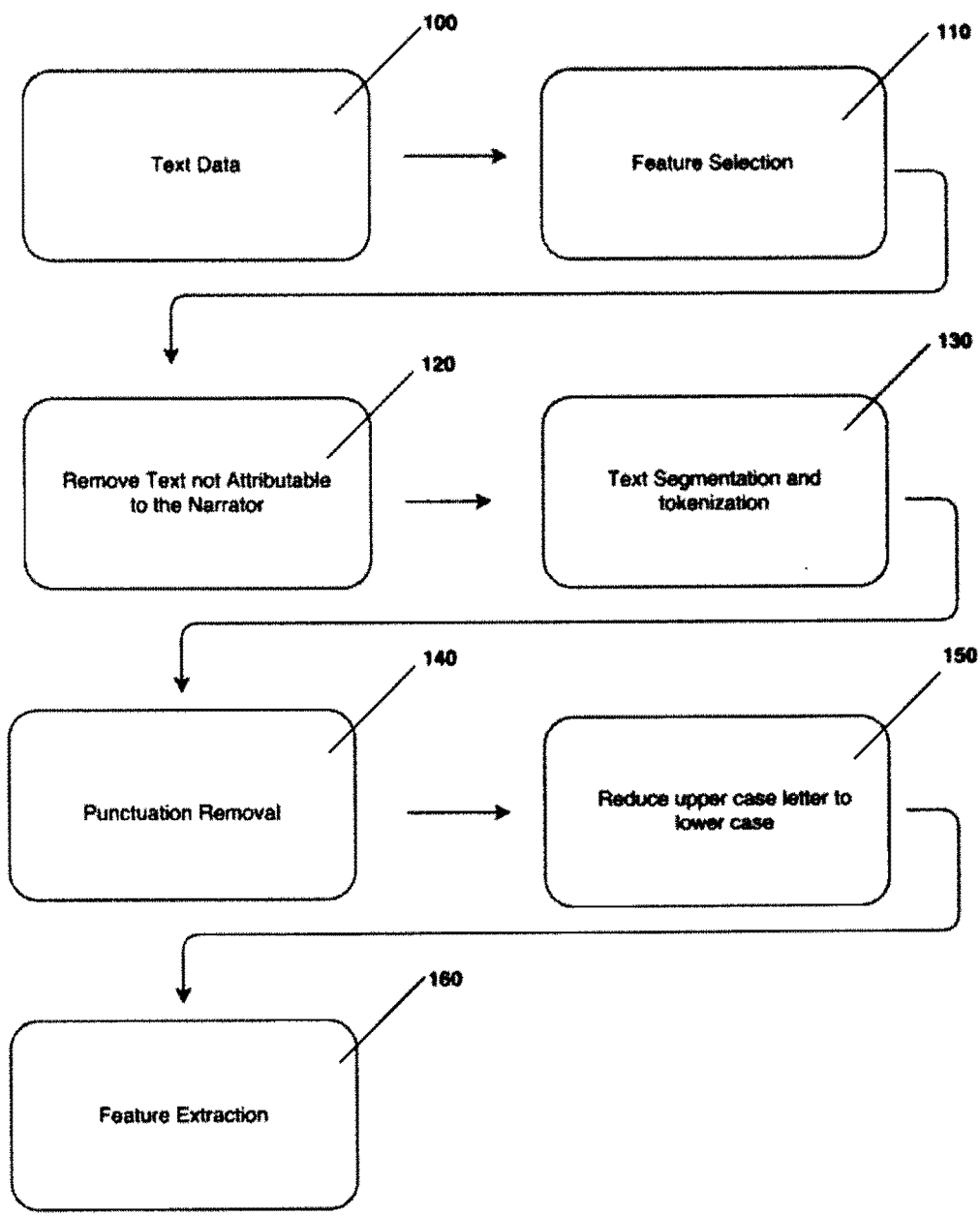
Fig. 1

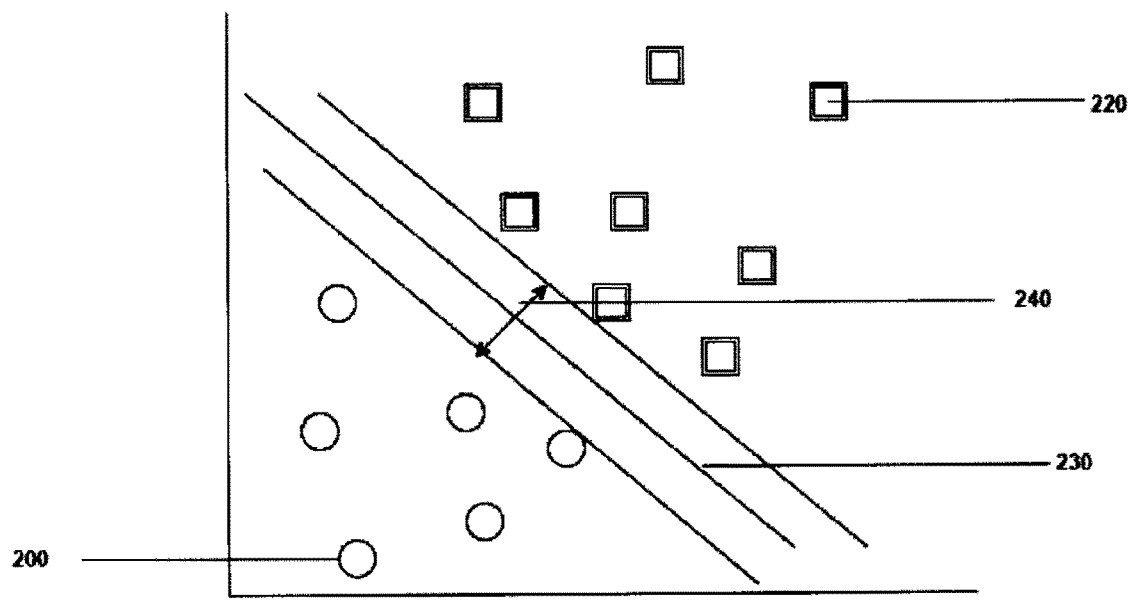
Fig. 2

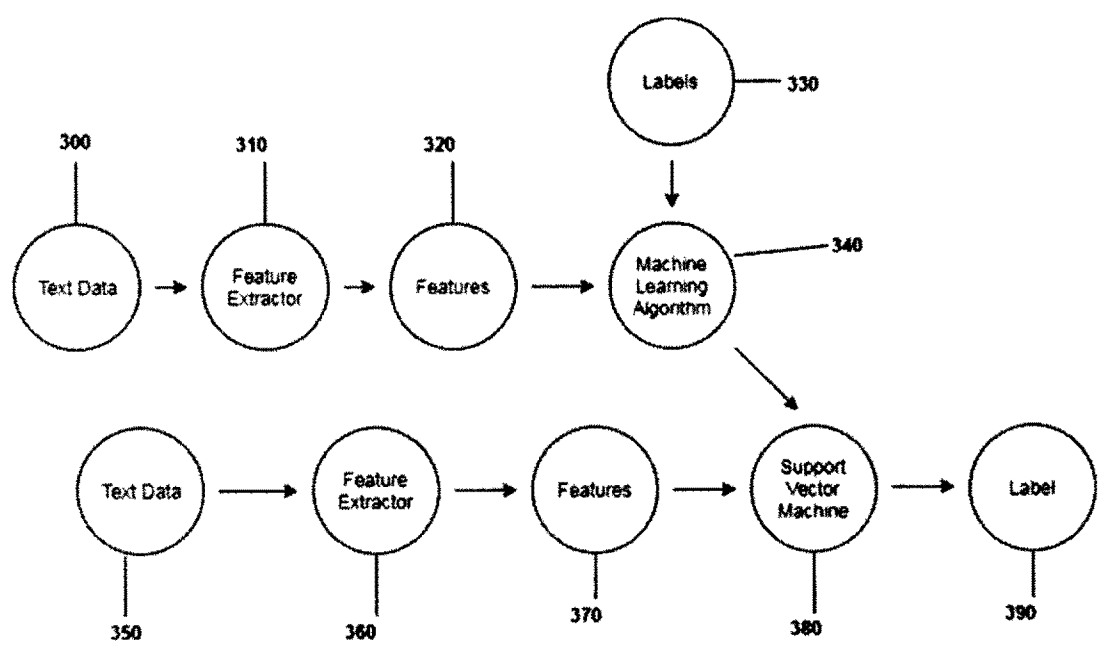
Fig. 3

FEATURES FOR AUTOMATIC CLASSIFICATION OF NARRATIVE POINT OF VIEW AND DIEGESIS

STATEMENT OF GOVERNMENT SUPPORT

This invention was made with government support under Grant No. 5R01GM105033-02 awarded by National Institutes of Health. The government has certain rights in the invention.

BACKGROUND

The style of narrative news affects how it is interpreted and received by readers. Two key stylistic characteristics of narrative text are point of view and diegesis: respectively, whether the narrative recounts events personally or impersonally, and whether the narrator is involved in the events of the story. Although central to the interpretation and reception of news, and of narratives more generally, there has been no prior work on automatically identifying these two characteristics in text.

BRIEF SUMMARY

Embodiments of the subject invention include a set of features to permit raw text to be classified in terms of the point of view and diegesis of the text. Embodiments can be used for automated narrative structure parsing of text data. The methods described herein can use machine learning techniques to predict the point of view and diegesis of text.

Embodiments of the subject invention can use software that automatically analyzes text, or natural language processing pipelines, and assist computer systems to interpret natural language to make decisions. The features for classification of n the point of view and diegesis can be used to provide computers with knowledge about narrators and their relationship to the story being told.

BRIEF DESCRIPTION OF DRAWINGS

FIG. 1 is a diagram of a feature extraction pipeline according to an embodiment of the subject invention.

FIG. 2 is a plot illustrating a support vector machine.

FIG. 3 is a flow diagram of a machine learning process flow.

DETAILED DESCRIPTION

Embodiments of the subject invention include a set of features, and methods of utilizing the same, that allows raw text to be automatically classified in terms of point of view and diegesis (e.g., either homodiegetic or heterodiegetic) and used for narrative structure parsing. It can also be used to give artificial intelligent agents awareness of the point of view and diegesis of a short span text, which is useful for interpreting stories and understanding narrators. Intelligent agents can use the diegesis to determine if a story is told personally or removed (impersonally).

Embodiments of the subject invention can use software that automatically analyzes text, or natural language processing pipelines, and assist computer systems to interpret natural language to make decisions. The features for classification of point of view and diegesis can be used to provide computers with knowledge about narrators and their relationship to the story being told. The systems and methods described herein can be used for higher level reasoning about narrative structure.

Embodiments of the subject invention provide a pipeline for feature extraction, as seen in FIG. 1. An initial step in a pipeline or method to extract features from text data 100 can be to remove text that is not directly the speech of the narrator. A user can choose which features to extract from the text data 110. One method to remove speech that is not attributable to the narrator is to remove quoted text from the raw text 120. A next step can break up the text into sentences 130. Punctuation characters can be removed from the text 140 (for example, ".", "?", "!", ",", ";", and ":"). A next step can be to convert every character that remains to lower case 150. A next step can be the program counts how many times each of the 21 pronouns from Table 1 are used. A next step can be to place an integer value for the number of times each pronoun is used into a feature vector. The value of a 22nd feature can be, for example, calculated as the number of times a 1st person pronoun is used in the argument of a verb. Each sentence can be organized as a rooted tree, including a parse tree. Each sentence can be processed, for example using semantic role labeling techniques, to detect semantic arguments of the sentences. Processing the sentence can include determining if there are any first person pronouns in the arguments. The number of sentences with first person pronouns in these arguments can be summed, and the value of a $22^{nd}$ feature can be set to this sum. The feature vector can be classified through machine learning techniques, including a support vector machine model.

The extracted features can be the number of times pronouns, as seen in Table 1, are used within a specific body of test. These features can be used to classify the text in terms of the narrative point of view and diegesis. Embodiments of the subject invention include a set of 22 features that allows a computer to classify the narrative diegesis of texts. For diegesis classification, a feature can be the number of times a $1^{st}$ person pronoun (for example, the pronouns listed in the first row of Table 1) appears in the argument of a verb.

TABLE 1

| | |
|---|---|
| 1st | I, me, my, mine, myself, we, us, our, ours |
| 2nd | you, your, yours |
| 3rd | he, him, his, she, her, hers, they, them, theirs |

Two key stylistic characteristics of narrative text are point of view and diegesis: respectively, whether the narrative recounts events personally or impersonally, and whether the narrator is involved in the events of the story. Interpreting a text's veridicality, correctly identifying the implication of its events, and properly delimiting the scope of its reference are all challenging and important problems that are critical to achieving complete automatic understanding of text. On the other hand, narrative text presents additional complications, in that to accomplish the tasks above, one must take into account the narrator's point of view (i.e., first person or third person), as well as the narrator's personal involvement in the story (herein referred to as "diegesis").

The point of view (POV) of a narrative is whether the narrator describes events in a personal or impersonal manner. There are, in theory, three possible points of view, corresponding to grammatical person; first, second, and third person. First person point of view involves a narrator referring to themselves, and implies a direct, personal observation of events. In a third person narrative, by contrast, the narrator is outside the story's course of action, looking in.

The narrator tells the reader what happens to the characters of the story without ever referring to the narrator's own thoughts or feelings.

In a second person narrative, the narrator tells the reader what he or she are feeling or doing, giving the impression that the narrator is speaking specifically to the reader him or herself and perhaps even controlling their actions. This is a relatively rare point of view (in a training corpus of English novels it occurred only once), and because of this we exclude it from consideration.

Knowing the point of view (first or third person) is important for understanding the implied veridicality as well as the scope of references within the text. Consider the following example text:

"John made everyone feel bad. He is a jerk." (1)

With regard to reference, if this is part of a first person narrative, the narrator is included in the scope of the pronoun everyone, implying that the narrator himself has been made to feel bad. In this case objectivity of the second sentence can be discounted if is known that the narrator feels bad on account of John. A third person narrator, by contrast, is excluded from the reference set, one can make no inference about this internal state and, thus, it does not affect the judgement of the implications of the accuracy or objectivity of later statements.

With regard to veridicality, if the narration is third person, statements of fact can be taken at face value with a higher default assumption of truthfulness. A first person narrator, in contrast, is experiencing the events not from an external, objective point of view, but from a personal point of view, and so assessment of the truth or accuracy of their statements is subject to the same questions as a second-hand report.

Diegesis can include a homodiegetic narrative, in which the narrator is involved or a heterodiegetic narrative in which the narrator is not involved in the story. A homodiegetic narrative includes a narrator that is not just the narrator but a character as well, performing actions that drive the plot forward. A heterodiegetic narrative includes a narrator who is observing the action, but not influencing its course. As reflected in Table 1, third person narrators are almost exclusively heterodiegetic, but first person narrators can be either. Like point of view, diegesis provides information to the reader on how to discount statements of fact, and so to judge the veridicality of the text.

Preprocessing can be the same for both point of view and diegesis. For example, the full text of the first 60 lines of a first chapter can be loaded into a string, and then all text within quotes can be deleted using a regular expression. For both POV and diegesis, the language spoken by narrator can be focused upon, whereas quoted text represents words can be associated with characters of the narrative. The benefits of removing the quoted text can be seen in at least Tables 3 and 4. After the quoted text is removed, the balance of the text can be tokenized and the sentence boundaries can be detected. Punctuation can be removed and upper case letters can be modified to lower case from the balance of the text after tokenization to produce an array of tokenized sentences, can be process for feature extraction.

Pronouns are a feature of diegesis and can help capture the relationship of the narrator to the story. If the narrator never refers to themselves in the text (i.e., a third person narrator), then it can be inferred that the narrator is acting in the capacity of a heterodiegetic narrator. First person narrators can be either homo- or hetero-diegetic. In this case, embodiments of the subject invention can count the number or type of pronouns that occur and analyze when first person pronouns, which represent the narrator, are used as arguments of verbs that represent events in the story. In order to accomplish these two objectives, embodiments of the subject invention provide software platforms configured to annotate text and provide semantic role labeling.

Embodiments of the subject invention provide a diegesis classifier configured to use occurrences of the first, second, and third person pronouns in addition to the features from the simple diegesis classifier as features, herein referred to as co-occurrences, as seen in Table 3.

Embodiments of the subject invention provide a support vector machine classifier. Referring to FIG. 2, a support vector machine is a discriminative classifier containing learning algorithms that can analyze the text data in the form of features vectors 200 and 220 to classify the text in terms of classes. The support vector machine can then establish an optimal hyperplane 230, which best separates the feature vectors 200 and 220. In order to describe the hyperplane 230, an input space can be mapped into a feature space. The optimal hyperplane is configured to provide a maximum margin 240 between hyperplane 230 and the closest element of each feature vector 200 and 220. The hyperplane 230 can be derived from support vectors (not shown in the figures) and described as an equation and scaled to suit a particular application. It should be appreciated by one of ordinary skill in the art, that although FIG. 2 presents a two dimensional illustration of a hyperplane, the SVM is capable of generating an N-dimensional hyperplane and configured in order to perform the methods that are described herein. Furthermore, the SVM can analyze patterns that are not linearly separable by transformations of original data to map into a new feature space, for example by using a kernel function.

As seen in FIG. 3, embodiments of the subject provide a support vector machine as a component of an overall machine learning architecture. The machine learning architecture can be subdivided into two phases—a training phase and a test phase. A processor in operable communication with a computer-readable medium can access a machine learning structure retained in the computer-readable medium. The processor can receive text data 300 with known labels from a plurality of sources, and the processor can extract the features 310 as provided in Table 1. The features 320 can be received and processed by a support vector machine model training algorithm 340. A user can provide labels, related to point of view and diegesis to the machine learning algorithm. The data can be processed and transmitted to the support vector machine which can label or annotate the data. This training process can repeated until the support vector machine 380 can accurately predict a label 390 for the data within an acceptable error range. After the machine learning software has been trained, arbitrary text data 350 can be transmitted to a feature extractor 360 and the extracted features 370 can be transmitted to a support vector machine model 380 for labeling. The performance of the point of view classification for different features sets can be seen in at least Table 2. The left hand column describes different sets of features used to train a support vector machine (SVM) classifier.

These features were extracted from the Corpus of English Novels. The columns to the right show the performance of each classifier when tested on CEN novels. Each data point is macro-averaged across the 10-folds of cross validation.

TABLE 2

| Feature Set | Quoted Text Removed | First Person Precision | First Person Recall | First Person A | Third Person Precision | Third Person Recall | $F_1$ | Avg. $F_1$ |
|---|---|---|---|---|---|---|---|---|
| Majority class baseline | | 0 | 0 | 0 | 0.724 | 1 | 0.839 | 0.607 |
| 3rd person pronouns only | ✓ | 0 | 0 | 0 | 0.73 | 0.994 | 0.842 | 0.61 |
| 2nd person pronouns only | ✓ | 0 | 0 | 0 | 0.745 | 0.984 | 0.848 | 0.615 |
| 2nd & 3rd person pronouns | ✓ | 0 | 0 | 0 | 0.735 | 0.979 | 0.839 | 0.608 |
| All pronouns | | 0.911 | 0.671 | 0.743 | 0.893 | 0.963 | 0.924 | 0.874 |
| 1st person pronouns | ✓ | 0.969 | 0.7 | 0.793 | 0.903 | 0.989 | 0.943 | 0.902 |
| 1st & 3rd person pronouns | ✓ | 0.955 | 0.729 | 0.808 | 0.911 | 0.984 | 0.945 | 0.907 |
| 1st & 2nd person pronouns | ✓ | 0.94 | 0.757 | 0.814 | 0.921 | 0.974 | 0.944 | 0.908 |
| All pronouns | ✓ | 0.944 | 0.814 | 0.859 | 0.938 | 0.973 | 0.954 | 0.928 |

Table 3 shows the performance of diegesis classification for different feature sets. These features were extracted from the Corpus of English Novels. The columns to the right show the performance of the each classifier when test novels from the Corpus of English Novels. Each data point is macro-averaged across the 10-fold of cross validation.

TABLE 3

| Feature Set | All Pronouns | Quoted Text Removed | Homodiegetic Precision | Homodiegetic Recall | $F_1$ | Heterodiegetic Precision | Heterodiegetic Recall | $F_1$ | $F_1$ |
|---|---|---|---|---|---|---|---|---|---|
| Majority class baseline | | | 0 | 0 | 0 | 0.796 | 1 | 0.886 | 0.706 |
| 1st pers. pronoun as verb arg. | ✓ | | 0.805 | 0.5 | 0.586 | 0.892 | 0.962 | 0.924 | 0.852 |
| 1st pers. as arg. + co-occurence | ✓ | ✓ | 0.847 | 0.480 | 0.589 | 0.889 | 0.976 | 0.93 | 0.858 |
| 1st pers. pronoun as verb arg. | | ✓ | 0.907 | 0.58 | 0.677 | 0.91 | 0.981 | 0.943 | 0.886 |
| 1st pers. pronoun as verb arg. | ✓ | ✓ | 0.931 | 0.62 | 0.721 | 0.917 | 0.981 | 0.947 | 0.898 |

TABLE 4

| Corpus | # Texts | 1st Person | 3rd Person | Homo. | Heterodiegetic | Accuracy Estm. |
|---|---|---|---|---|---|---|
| Reuters-21578 | 19,043 | 1 (<1%) | 19,042 (~100%) | 1 (<1%) | 19042 (~100%) | 99%/99% |
| EurekAlert | 12,135 | 31 (<1%) | 12,104 (~100%) | 5 (<1) | 12,129 (~100%) | 97%/94% |
| CSC Extremist | 3,300 | 42 (1%) | 3,258 (99%) | 15 (<1%) | 3,285 (~100%) | 94%/92% |
| Lexis Nexis | 4,974 | 1,290 (26%) | 3,6114 (74%) | 818 (16%) | 4,156 (84%) | 70%/40% |
| Spinn3r | 201 | 133 (66%) | 68 (34%) | 67 (33%) | 134 (67%) | 42%/21% |

Embodiments of the subject invention can use uses the occurrence of all pronouns as features as a classifier for point of view. As seen in Table 2, empirical results provide a measure of the tests accuracy, $F_1$, as 0.859 for first person POV, and 0.954 for third person POV. The weighted average over the two classes is a 0.928 $F_1$.

Embodiments of the subject invention can count the first person pronouns as verb arguments as well as the occurrence of each pronoun as a classifier for diegesis. As seen in Table 3, Empirical results show an $F_1$ of 0.721 for homodiegetic and 0.947 for heterodiegetic. The weighted average over the two classes is a 0.898 $F_1$.

As seen in Table 2, the majority class baseline classifier has 0.607 $F_1$. As seen in Table 3, the majority baseline classifier for diegesis has 0.706 $F_1$, while the best diegesis classifier has 0.898 $F_1$.

In certain embodiments, pronoun argument detection can be restricted only to those verbs that actually indicate events in the story. This focuses the classifier on places where the narrator is involved in driving the story forward, which is more closely aligned with the definition of diegesis. This can be accomplished by incorporating an automatic event detector In another embodiment of the subject invention, classifiers can be analyzed to detect if a narrative characteristic changes over the course of a text.

In yet another embodiment densities or ratios for the occurrences of the pronouns, instead of raw counts can be used for classifying texts, including short text that are for example, less than 60 lines long.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processer reads and executes the code and/or data stored on a computer-readable medium, the computer system and/or processer performs the methods and processes embodied as data structures and code stored within the computer-readable storage medium.

pronoun "I." The POV classifier interpreted this document as first person because the text of Volcker's letter was not removed in the quotation removal phase. The letter was not removed in the quotation removal phase. The letter is quoted using direct speech, which a simple, regular-expression-based quotation detection system cannot recognize.

To estimate the true accuracy of the POV classifier over the Reuters corpus the POV of 200 texts (including the single first person text) were randomly sampled and checked. All of the classifications were correct except the single first person text, resulting in an accuracy estimate of 99.5% over the newswire text for the POV classifier (1.3% margin of error at 99% confidence).

To estimate the true accuracy of the diegesis classifier over this corpus we randomly sampled and checked the diegesis of 200 texts (including the single homodiegetic text). Of the 199 heterodiegetic texts, all were correct, while the single homodiegetic text was incorrect, resulting in an accuracy estimate of 99% for the diegesis classifier over the newswire text (1.81% margin of error at 99% confidence).

Example 6—EurekAlert Press Releases

This corpus contains 12,135 texts scraped from the EurekAlert, dated between Jun. 1st and Dec. 31, 2009. The distribution of this corpus is similar to the Reuters corpus, and over 99% of the texts were classified as third person and heterodiegetic narrations. Press offices write press releases to entice journalists to write newswire articles, and so it makes sense that they will attempt to mimic the desired narrative distance in the press release, seeking to present themselves as unbiased narrators.

To estimate the true accuracy of the POV classifier over the press releases we randomly sampled and checked the diegesis of 120 texts, including two first person and 118 third person. Of the two first person texts, one was correct, and of the 118 third person texts, 115 were correct, resulting in an accuracy estimate for the POV classifier of 97% over the press release text (4.03% margin of error at 99% confidence).

To estimate the true accuracy of the diegesis classifier over this corpus we randomly sampled and checked the diegesis of 120 texts, including 2 homodiegetic and 118 heterodiegetic. Of the two homodiegetic texts, neither were correct, and of the 118 heterodiegetic texts, 111 were correct, resulting in an accuracy estimate for the diegesis classifier of 94% over the press release text (5.6% margin of error at 99% confidence).

Example 7—LexisNexis Opinions and Editorials

This corpus comprises 4,974 texts labeled opinion or editorial scraped from the LexisNexis website, dated between January 2012 and August 2016. Texts were included if they contained more than 100 words and appeared in one of a set of major world publications including, for example, the New York Times, the Washington Post, and the Wall Street Journal. About one-quarter of these texts are first person, and more than half of the first person narrators were homodiegetic. The increased abundance of first person and homodiegetic texts can be expected as the purpose of these types of articles is often to express individual opinions or the writer's person experience of events.

To estimate the true accuracy of the POV classifier over the LexisNexis articles, the POV of 200 texts were randomly sampled and checked, 50 from those classified as first person and 150 from those classified as third person. Of the 50 texts classified as first person all were confirmed correct, while of the 150 texts classified as third person only 90 were confirmed correct. This suggests that the classifier is not properly identifying all of the first person narrator in the LexisNexis corpus, and results in an accuracy estimate of 70% for the POV classifier over the LexisNexis texts (2.7% margin of error at 99% confidence).

To estimate the true accuracy of the diegesis classifier over this corpus we randomly sampled and checked the diegesis of 200 texts, including 24 homodiegetic and 126 heterodiegetic texts. Of the 24 homodiegetic texts, all were correct, and of the 126 heterodiegetic texts, 51 were correct, allowing us to estimate that the diegesis classifier has an accuracy of 40% over the press release text (11% margin of error at 99% confidence).

Example 8—Spinn3r Web Blogs

This corpus comprises 201 stories extracted by Gordon and Swanson (2009) from the Spinn3r 2009 Web Blog corpus (Burton et al., 2009). These texts come from web blogs, where people often tell personal stories from their perspective, or use the blog as a public journal of their daily life. In contrast with newswire text, there is no expectation that a blog will report the truth in an unbiased manner. The distribution of the POV on this corpus reflects this tendency, with 66% of the texts being first person.

The diegesis distribution for the web blog stories was not unexpected: slightly more than half of the blog stories with first person narrators are homodiegetic. These are the most personal stories of the web blog story corpus, in which the narrator is involved in the story's action.

To estimate the true accuracy of the POV classifier on the Spinn3r corpus, 20 texts were randomly sampled, 13 from those classified as first person and 7 classified as third person. Of the 13 first person texts, 9 were confirmed correct, while of the 7 third person texts only 3 were confirmed correct. Overall, the classifier has trouble classifying the web blog texts. This might be due to syntactic irregularities of blog posts, which vary in their degree of adherence to proper English grammar. With respect to third person narrators the POV classifier is estimated to have an accuracy of 42% over the web blog text (34% margin of error at 99% confidence).

To estimate the true accuracy of the diegesis classifier over this corpus the diegesis of 20 texts were randomly sampled and checked, including six homodiegetic and 14 heterodiegetic texts. Of the six homodiegetic texts, all were correct, and of the 14 heterodiegetic texts, three were correct. With respect to the heterodiegetic narrators the diegesis classifier is estimated to have an accuracy of 21% over the press release text (27% margin of error at 99% confidence).

Example 9—Islamic Extremist Texts

The CSC Islamist Extremist corpus contained 3,300 story texts, as identified by Corman et al. (2012). These texts were original posted on Islamist Extremist websites or forums. The POV classifier found that 99.7% of the extremist stories were written in the third person. For the most part, the extremist stories were second hand accounts of events, often to share news about the outcome of battles or recount the deeds of Jihadists.

To estimate the true accuracy of the POV classifier on this corpus, 150 texts were randomly sampled, 2 from those classified as first person, and 148 classified as third person.

Both of the texts classified as first person were verified to be first person narrators. Of the 148 texts classified as third person, 139 were verified correct. With respect to third person narrators, the classifier has an estimated accuracy of 93.9% over the extremist texts (4.92% margin of error at 99% confidence).

To estimate the true accuracy of the diegesis classifier over this corpus the diegesis of 150 texts were randomly sampled and checked, including 2 homodiegetic and 148 heterodiegetic texts. Of the 2 homodiegetic texts, 1 was correct, and of the 148 heterodiegetic texts, 137. With respect to the heterodiegetic narrators, we can estimate the classifier has an accuracy of 92% over the press release text (5.6% margin of error at 99% confidence).

Example 10

Automatic classifiers for point of view and diegesis, were developed and the performance of different feature sets for both were compared. A gold-standard corpus was built wherein the corpus was double-annotated to substantial agreement (k>0.59) 270 English novels for point of view and diegesis. Personal pronouns comprise the best features for point of view classification achieving an average $F_1$ of 0.928. For diegesis, the best features were personal pronouns and the occurrences of first person pronouns in the argument of verbs, achieving an average $F_1$ of 0.898. The classifier was applied to nearly 40,000 news texts across five different corpora, large sets of texts, comprising multiple genres (including newswire, opinion, blog posts, and scientific press releases). The experiment showed that the point of view and diegesis correlates largely as expected with the nominal genre of the texts.

The experiment established a high performing classifier for point of view with 0.928 $F_1$, and a good classifier for diegesis with 0.898 $F_1$. To evaluate the classifiers a double annotated corpus was created with gold-standard annotations for point of view and diegesis-based on the first 60 lines-of 270 English novels. These classifiers were applied to almost 40,000 news story texts drawn from five different corpora, and show that the classifiers remain highly accurate and that the proportions of POV and diegesis they identify correlated in an expected way with the genre of the news texts.

Example 11

Annotators marked narrative POV and diegesis from the first 60 lines of each of 270 English novels, which is a generous simulation of "the first page." The collection of data was transformed for supervised machine learning from an unmanageable burden (i.e., having annotators read every novel from start to finish) into a tractable task (reading only the first page). Novels were chosen for training, instead of news texts themselves, because of the novels' greater diversity of language and style.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] [Aufderheide 1997], Public Intimacy: The Development of First-Person Documentary, Aufderheide, Patricia, 1997, Afterimage: The Journal of Media Arts and Cultural Criticism, 25(1):16-18.

[2] [Bal 2009], Narratology: Introduction to the Theory of Narrative, Bal, Mieke, 2009, University of Toronto Press, Toronto.

[3] [Burton et al. 2009], The {ICWSM} 2009 Spinn3r Dataset, Burton, Kevin and Java, Akshay and Soboroff, Ian, 2009.

[4] [Ceran et al. 2009], Proceedings of the 3rd Annual Conference on Weblogs and Social Media (ICWSM 2009), San Jose, Calif., In proceeding A Hybrid Model and Memory Based Story Classifier, Proceedings of the 3rd International Workshop on Computational Models of Narrative (CMN'12), Ceran, Betul and Karad, Ravi and Corman, Steven and Davulcu, Hasan, Istanbul, Turkey, pages 60-64.

[5] [Chang and Lin 2001], LIBSVM: A Library for Support Vector Machines, Chang, Chih-Chung and Lin, Chih-Jen, 2011, ACM Transactions on Intelligent Systems and Technology (TIST), 2(3), 1-27.

[6] [Davison 1983], The Third-Person Effect in Communication, Davison, W. Phillips, 1983, Public Opinion Quarterly, 47(1): 1-15.

[7] [Desmet 2008] Corpus of English Novels, De Smet, Hendrik, 2008, https://protect-us.mimecast.com/s/zNkvBNfMANI2.

[8] [Devore 2011], Probability and Statistics for Engineering and the Sciences, Devore, Jay L., 2011, $8^{th}$ edition, Cengage Learning, Boston, Mass.

[9] [Finlayson 2008], Collecting Semantics in the Wild: The Story Workbench, Finlayson, Mark A., 2008, Proceedings of the AAAI Fall Symposium on Naturally Inspired Artificial Intelligence (NIAI), Arlington, Va., pages 46-53.

[10] [Finlayson 2011], The Story Workbench: An Extensible Semi-Automatic Text Annotation Tool, Finlayson, Mark A., 2011, Proceedings of the 4th Workshop on Intelligent Narrative Technologies (INT4), Stanford, Calif., pages 21-24.

[11] [Gordon and Swanson 2009], Identifying Personal Stories in Millions of Weblog Entries, Gordon, Andrew and Swanson, Reid, 2009, Proceedings of the 3rd International Conference on Weblogs and Social Media (ICWSM 2009), Data Challenge Workshop, San Jose, Calif.

[12] [Hart 1971], Project Gutenberg, Hart, Michael, 1971, https://protect-us.mimecast.com/s/rxdvBxf5AQuO.

[13] [Landis and Kock 1977], Landis, Richard and Koch, Gary, The Measurement of Observer Agreement for Categorical Data, 1977, Biometrics, 33(1), pages 159-174.

[14] [Mani 2012], Computational Modeling of Narrative, Mani, Inderjeet, 2012, Morgan & Claypool Publishers, Williston, V T.

[15] [Manning et al. 2014], The Stanford CoreNLP Natural Language Processing Toolkit, Manning, Christopher D and Surdeanu, Mihai and Bauer, John and Finkel, Jenny Rose and Bethard, Steven and McClosky, David, 2014, Proceedings of the 52nd Annual Meeting of the Association for Computational Linguistics, System Demonstrations, Baltimore, Md., pages 55-60.

[16] [Sagae et al. 2013], A Data-Driven Approach for Classification of Subjectivity in Personal Narratives, Sagae, Kenji and Gordon, Andrew and Dehghani,